US012340286B2

(12) United States Patent
Bibireata et al.

(10) Patent No.: US 12,340,286 B2
(45) Date of Patent: Jun. 24, 2025

(54) MODEL MANAGEMENT SYSTEM FOR IMPROVING TRAINING DATA THROUGH MACHINE LEARNING DEPLOYMENT

(71) Applicant: Landing AI Inc., Palo Alto, CA (US)

(72) Inventors: Daniel Bibireata, Bellevue, WA (US); Andrew Yan-Tak Ng, Vancouver, WA (US); Pingyang He, Palo Alto, CA (US); Zeqi Qiu, Mountain View, CA (US); Camilo Iral, Guarne (CO); Mingrui Zhang, Beijing (CN); Aldrin Leal, Envigado (CO); Junjie Guan, Redmond, WA (US); Ramesh Sampath, Fremont, CA (US); Dillon Laird, San Francisco, CA (US); Yu Qing Zhou, San Francisco, CA (US); Juan Camilo Fernancez, Medellin (CO); Camilo Zapata, Medellin (CO); Sebastian Rodriguez, Medellin (CO); Cristobal Silva, Medellin (CO); Sanjay Bodhu, Aurora, IL (US); Mark William Sabini, River Edge, NJ (US); Leela Seshu Reddy Cheedepudi, Milpitas, CA (US); Kai Yang, Fremont, CA (US); Yan Liu, Palo Alto, CA (US); Whit Blodgett, San Francisco, CA (US); Ankur Rawat, Bothell, WA (US); Francisco Matias Cuenca-Acuna, Cordoba (AR); Quinn Killough, Sonoma, CA (US)

(73) Assignee: LandingAI Inc., Palo Alto, CA (US)

( * ) Notice: Subject to any disclaimer, the term of this patent is extended or adjusted under 35 U.S.C. 154(b) by 871 days.

(21) Appl. No.: 17/470,368

(22) Filed: Sep. 9, 2021

(65) Prior Publication Data
US 2022/0300855 A1    Sep. 22, 2022

Related U.S. Application Data

(60) Provisional application No. 63/195,698, filed on Jun. 1, 2021, provisional application No. 63/163,368, filed on Mar. 19, 2021.

(51) Int. Cl.
*G06N 3/08* (2023.01)
*G06N 20/00* (2019.01)

(52) U.S. Cl.
CPC ............... *G06N 20/00* (2019.01); *G06N 3/08* (2013.01)

(58) Field of Classification Search
CPC ...................................... G06N 3/08
See application file for complete search history.

(56) References Cited

U.S. PATENT DOCUMENTS 10,339,470 B1 *  7/2019  Dutta ................ G06N 20/20
11,593,639 B1 *  2/2023  Garg ................. G06F 18/2415
(Continued)

OTHER PUBLICATIONS

Hendrycks, Dan, and Kevin Gimpel. "A baseline for detecting misclassified and out-of-distribution examples in neural networks." arXiv preprint arXiv:1610.02136 (2016). (Year: 2016).*
(Continued)

*Primary Examiner* — Hal Schnee
(74) *Attorney, Agent, or Firm* — Fenwick & West LLP (57) ABSTRACT

A model management system adaptively refines a training dataset for more effective visual inspection. The system trains a machine learning model using the initial training dataset and sends the trained model to a client for deployment. The deployment process generates outputs that are sent back to the system. The system determines that performance of predictions for noisy data points are inadequate and determines a cause of failure based on a mapping of the noisy data point to a distribution generated for the training
(Continued)

dataset across multiple dimensions. The system determines a cause of failure based on an attribute of the noisy datapoint that deviates from the distribution of the training dataset and performs refinement towards the training dataset based on the identified cause of failure. The system retrains the machine learning model with the refined training dataset and sends the retrained machine learning model back to the client for re-deployment.

20 Claims, 7 Drawing Sheets

(56) References Cited

U.S. PATENT DOCUMENTS

| | | | | |
|---|---|---|---|---|
| 2017/0082555 A1* | 3/2017 | He | | G06N 20/20 |
| 2018/0316707 A1* | 11/2018 | Dodson | | H04L 43/16 |
| 2021/0073973 A1* | 3/2021 | Zou | | G06T 7/80 |
| 2021/0142292 A1* | 5/2021 | Ozcaglar | | G06F 18/24 |
| 2022/0004820 A1* | 1/2022 | Meron | | G06F 18/2178 |
| 2022/0036128 A1* | 2/2022 | Levanony | | G06F 18/24 |

OTHER PUBLICATIONS

Devries, Terrance, and Graham W. Taylor. "Learning confidence for out-of-distribution detection in neural networks." arXiv preprint arXiv:1802.04865 (2018). (Year: 2018).*

Leo, Justin, and Jugal Kalita. "Incremental deep neural network learning using classification confidence thresholding." IEEE Transactions on Neural Networks and Learning Systems 33.12 (2021): 7706-7716. (Year: 2021).*

Shmelkov, Konstantin, Cordelia Schmid, and Karteek Alahari. "Incremental learning of object detectors without catastrophic forgetting." Proceedings of the IEEE international conference on computer vision. 2017. (Year: 2017).*

Mu, Xin, Kai Ming Ting, and Zhi-Hua Zhou. "Classification under streaming emerging new classes: A solution using completely-random trees." IEEE Transactions on Knowledge and Data Engineering 29.8 (2017): 1605-1618. (Year: 2017).*

\* cited by examiner

Defect Framework Overview

| | | | | | | |
|---|---|---|---|---|---|---|
| 72 pin socket ▼ | | | | | | +New Project |
| | Category | Defects | | Definition | Sample Image/Video | Required Coverage |
| OK | | [other] | | Short definition goes here. | | 100 [Delete] |
| | | | | | | |
| NG | Scratch | Shallow | | Definition | Sample Image/Video | Est. Image/Video |
| | | Sand paper | | 1 mm depth | | 1,000 |
| | | E.g. Shallow | E.g. 90% | Textured spot, not a single line | | 24 |
| | Hole | E.g. Hole | | E.g. Textured spot, not a single line | [*Upload] | E.g. 1000 |
| | | Small hole | | Consider it as NG any obvious dent, holes in the pin area. The chance of this defect is extremely low. | | |
| | | E.g. Hole | E.g. Shallow | E.g. 90% | E.g. Textured spot, not a single line | [*Upload] | E.g. 1000 |
| | Missing part | Missing pin | | The pin is completely gone or 1/4th of the standard length. | | 400 |
| | | E.g. Hole | E.g. Shallow | E.g. 90% | E.g. Textured spot, not a single line | [*Upload] | E.g. 1000 |
| UNLABELED | | | | Definition | Sample Image/Video | Est. Image/Video |
| | | | | Short definition goes here. | | 100 |
| | | | | | | Total: 2,754 |

MODEL MANAGEMENT SYSTEM FOR IMPROVING TRAINING DATA THROUGH MACHINE LEARNING DEPLOYMENT

CROSS-REFERENCE TO RELATED APPLICATIONS

This application claims priority under 35 U.S.C. § 119(e) to U.S. Provisional Patent Application Ser. No. 63/195,698, "Data Service for Detecting and Improving Poor Training Data Through Machine Learning Deployment," filed Jun. 1, 2021, and U.S. Provisional Patent Application Ser. No. 63/163,368, "Moving From Model-Centric to Data-Centric AI," filed Mar. 19, 2021, the disclosure of which are hereby incorporated by reference herein in their entirety.

BACKGROUND

Existing manufacturing systems enable defect detection by training machine learning models to identify known defects. While attempts are made to generate pools of training data to identify all possible defects, inevitably, false positives still occur where adequate product is manufactured but flagged as a defect, and other defects might occur where inadequate product is manufactured but not flagged as a defect. Defect detection is imperfect because it is difficult to control for variations, such as environmental variations, different colorations, varied focuses of images, different lightings, unexpected errors, and so on. To avoid distributing defective product, manufacturers err on the side of increasing false positives to reduce the chances that a defective product is not flagged, which results in immense waste in discarding flagged product that is in fact not defective.

SUMMARY

Systems and methods are disclosed herein for a model management system that adaptively refines a training dataset for more effective visual inspection. The model management system may receive and label input data (e.g., label images) from a client, and develop an initial training dataset based on the labeled images. The model management system may train a machine learning model using the initial training dataset and send the trained model to the client for deployment. The deployment process may generate a set of outputs, which is sent back to the model management system for further analysis. The model management system may determine based on the set of outputs, that performance of predictions for one or more noisy data points are inadequate (e.g., confidence score of the classification for the data point is below a pre-determined threshold). The model management system may determine a cause for the inadequate performance (also referred as cause of failure) by mapping the noisy data point to a distribution generated for the training dataset across multiple dimensions, where each dimension may represent an attribute associated with an environmental factor related to images in the training dataset. The model management system may determine a cause of failure based on one or more attributes of the noisy datapoint that deviates from the distribution of the training dataset. The model management system may perform a refining process towards the training dataset based on the identified cause of failure. The model management system may retrain the machine learning model with the refined training dataset and send the retrained machine learning model back to the client for deployment.

The disclosed model management system provides multiple advantageous technical features for addressing the issue of inadequate model performance for visual detection as described in the background. For example, the disclosed model management system performs an automatic refining process of a training dataset, in addition to optimizing model parameters as seen in traditional training process of machine learning models. The model management system may identify one or more attributes (e.g., environmental factors such as lighting color or focus) that cause the noisy data points to deviate from the distribution of the training dataset. The model management system may perform an automatic refinement process that modifies the identified attributes and may retrain the model with refined training dataset. In an embodiment, responsive to determining that the noisy data points have a low confidence score where the attributes of the noisy data point align with the distribution of the training dataset, the model management system may flag the noisy data points as potential new objects that are not observed in the current training dataset, and the training dataset may also be refined by adding additional labels. While existing model training processes heavily focus on training model parameters while holding the training dataset fixed, the disclosed model management system and method improves the field of visual detection by performing a refinement process for the training dataset (e.g., in addition to optimizing model parameters), which provides an advantageous technical feature that helps to resolve the deficiency as observed in existing implementation methods.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
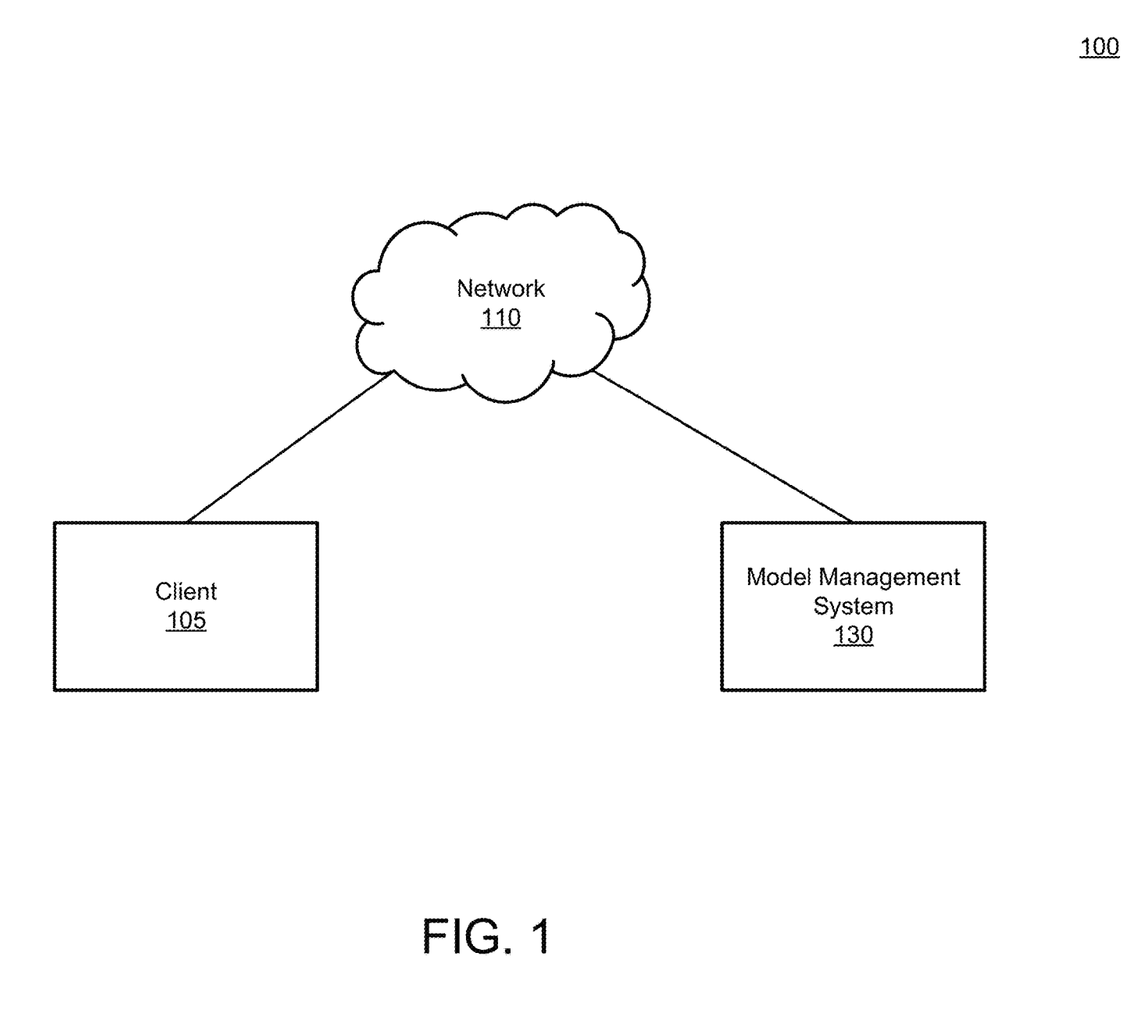
FIG. 1 is an exemplary system environment including a model management system, according to one embodiment.

FIG. 1 is a high level block diagram of a system environment for a model management system 130, in accordance with an embodiment. The system environment 100 shown by FIG. 1 includes one or more clients 105, a network 110, and the model management system 130. In alternative configurations, different and/or additional components may be included in the system environment 100.

The network 110 represents the communication pathways between the client 105 and model management system 130. In one embodiment, the network 110 is the Internet. The network 110 can also utilize dedicated or private communications links that are not necessarily part of the Internet. In one embodiment, the network 110 uses standard communications technologies and/or protocols. Thus, the network 110 can include links using technologies such as Ethernet, Wi-Fi (802.11), integrated services digital network (ISDN), digital subscriber line (DSL), asynchronous transfer mode (ATM), etc. Similarly, the networking protocols used on the network 110 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. In one embodiment, at least some of the links use mobile networking technologies, including general packet radio service (GPRS), enhanced data GSM environment (EDGE), long term evolution (LTE), code division multiple access 2000 (CDMA2000), and/or wide-band CDMA (WCDMA). The data exchanged over the network 110 can be represented using technologies and/or formats including the hypertext markup language (HTML), the extensible markup language (XML), the wireless access protocol (WAP), the short message service (SMS) etc. In addition, all or some of the links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The client 105 may include one or more computing devices that display information to users, communicate user actions, transmit, and receive data from the model management system 130 through the network 110. While one client 105 is illustrated in FIG. 1, in practice many clients 105 may communicate with the model management system 130 in the environment 100. In one embodiment, client 105 may be operated in connection with a service provided by the model management system 130 for visual inspection. For example, client 105 may be operated by a representative of a manufacturing entity, a quality assurance entity, or any other entity interested in visual inspection such as marker detection. The term marker typically refers to a defect in a manufactured product but may refer to any significant marking on an object. Notwithstanding the breadth of the disclosure extending to any marker, the term defect is used interchangeably with the term marker throughout this disclosure for conciseness and clarity.

The client 105 may receive software services by using software tools provided by the model management system 130 for visual inspection. The tools may be software applications or browser applications that enable interactions between the client 105 and the model management system 130 via the network 110. The client 105 may access the software tool through a browser or may download the software tool through a third-party app platform, such as an app store. In one embodiment, the client 105 interacts with the network 110 through an application programming interface (API). In one embodiment, the tools may receive inputs from the client 105 which are further used to develop training dataset. The software tools may include an interface through which the client 105 may provide information that defines a framework with respect to an object for visual inspections. The client 105 may use the tool to develop a visual guide, which may be used as a guidance to develop a training dataset.

The client 105 may include one or more computing devices that are capable of deploying a machine learning model. The client 105 may receive trained machine learning models from the model management system 130 and perform real-world deployments of the trained machine learning model on a dataset collected from a real-world manufacturing process. The real-world deployments of the model may be conducted on one or more devices of the client 105. In one embodiment, the client 105 may include dedicated devices for performing the task of training and deploying machine learning models. The model may also be deployed remotely by the model management system 130 (or a third-party cloud service that is capable of deploying the model), in which case, images may be transmitted from client 105 to the model management system 130 (or the cloud service provider). The model management system 130 may analyze the images and provide outputs back to client 105 (e.g., through a network communication, such as communication over the Internet). Where the model is deployed local to the client, a software package developed and distributed by model management system 130 may be downloaded to or otherwise transferred to client 105 and may be executed to perform any described post-output analysis.

The model management system 130 may manage and provide an end-to-end service for training a machine learning model for visual inspection such as detecting markers. The term marker typically refers to a defect in a manufactured product but may refer to any significant marking on an object, the significance being defined by a guidance provided by the client and explained by labeled training data. For example, a blemish on a steel bolt may be marked by a machine learning model as a blemish, whereas a stripped threading on the steel bolt may be marked by the machine learning model as a defect, where defects lead to a discarding of the bolt, and blemishes lead to another outcome (e.g., painting before distribution).

The model management system 130 may provide a tool such as a software application to client 105 and receive inputs from the client 105 for developing an initial training dataset. The model management system 130 may receive information defining a framework for labeling training dataset and use a human classifier or a classifier trained by a machine learning model, or a combination of both to label the input images received from the client 105. For example, the model management system 130 may receive images of objects from the client 105, such as manufactured products, some of which contain defects, and some of which do not. The images may be photos taken by a camera or images captured using other sensors such as an infrared imaging sensors. For example, infrared imaging may be used for defect detection if an unexpected absorption property occurs which may be an indication for potential defects. The images may be annotated, or not annotated (which would result in data service 100 annotating the images). Further details with regard to a framework for developing an initial training dataset are illustrated in FIG. 2.

Figure 2:
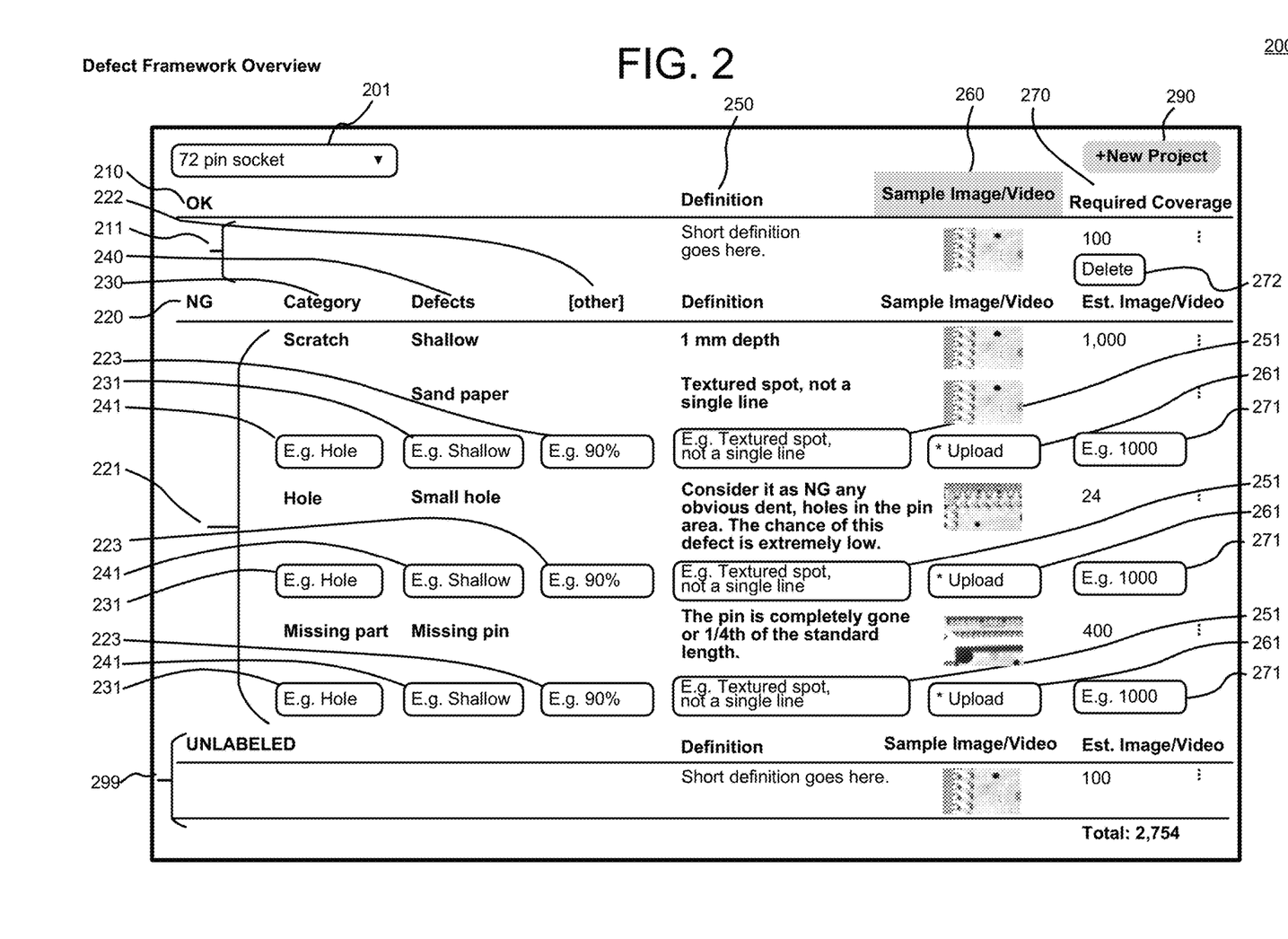
FIG. 2 is an exemplary user interface for a framework for defining a framework, in accordance with one embodiment.

FIG. 2 shows an exemplary user interface for defining the framework. User interface 200 may be output for display to a user, such as an administrator. The framework that is defined using user interface 200 may be with respect to an object as selected using object selection tool 201. As depicted, object selection tool 201 is used to select a 72 pin socket. Also as depicted, object selection tool 201 may be a drop-down menu, from which objects may be selected, and responsive to detecting such a selection, the processor would populate user interface 200 with a corresponding existing framework. Object selection tool 201 may be any means of selecting an object having a corresponding existing framework, above and beyond a drop-down menu. Moreover, object selection tool 201 may include an option for inputting a new object for which a framework is not yet defined, in which case the processor may populate a blank or template framework in user interface 200, through which the user may define the framework for that object. Objects selectable using object selection tool 201 may correspond to a given project; a user may launch a new project to populate different frameworks for objects by selecting new project icon 290. In an embodiment, object selection tool may enable a user to select multiple types of objects for a single framework.

User interface 200 may include a section for defining attributes of the object that would dictate whether to tag an image of the object with a given label. As depicted, two possible labels are indicated for the object—label 210, which is a label of "OK," and label 220, which is a label of "NG." As discussed above, user interface 200 may include any number of labels, as defined by the user, with corresponding sections for defining those labels consistent with section 211 for defining the framework for the "OK" label and section 221 for defining the framework for the "NG" label. A section 299 may additionally be added to describe images that are not yet labeled. Definition column 250 is a column where a user may define a corresponding classification. For example, a classification corresponding to a defect not existing (and thus corresponding to OK label 210), may be defined to be an image of a 72 pin socket that is not scratched, does not have deformed hole, and is not missing any parts. The user may input the text of a definition using definition interface 251, which as depicted, is a text entry field with sample text for the type of information that may be input. Various definitions of different types of defects that, if detected by a classifier, would result in an application of NG label 220, are also depicted in definition column 250, such as a scratch having a depth of 1 mm, or a textured spot that is a scratch that is not a single line. Sample column 260 may include one or more images (e.g., a spectrum of images, as will be described in further detail with respect to FIG. 4), or one or more videos, that show an example image corresponding to that definition. Upload icon 261 may be selected in a given row. Responsive to detecting selection of upload icon 261, the processor may prompt the user to select one or more images or videos to upload for inclusion in that given row.

Required coverage row 270 includes an estimate of the user of how many images or videos are needed, e.g., to train a machine learning model to accurately classify new images. For example, because images that are not defective are relatively homogenous, a low number, such as 100, images may be sufficient. Because shallow scratches come in many forms and sizes, however, the user may estimate that 1000 images will be needed to train the machine learning model. The user may input the required coverage using required coverage interface 271, which, when selected, causes the processor to enable the user to input an amount of required coverage. Delete icon 272 enables the user to delete a given estimation. While delete icon 272 is only depicted with respect to required coverage column 270, the processor may include delete icons or options in any other column of user interface 200 and may apply a delete option to an entire row.

Turning now to section 221, category column 230 describes various categories corresponding to label 220 (in this case, categories corresponding to a defective 72 pin socket). The user inputs these categories using category interface 231, where the user may input a name of a category, such as "scratch," "hole," or "missing part." Sub-category column 240 may be used to define sub-categories of a given category. The framework may be hierarchical, including sub-categories. For example, the category "scratch" may include scratches that are shallow, and scratches that are caused by sandpaper. The user may enter these sub-categories using sub-category interface 241. In an embodiment, rather than having discrete categories and/or sub-categories, the framework may include continuous values (e.g., a scratch with 0-0.9 mm depth, a scratch with 0.9 mm-1 mm depth, etc.). The user may customize each column or define new columns. For example, the user may define other column 222 in any manner desired and may include information using other interface 223.

In one embodiment, a human classifier, a classifier trained by a machine learning model, or a combination of both may rely on the guidance as illustrated in FIG. 2 for defining a framework for labeling training dataset and use to label the input images received from the client 105. After images are annotated, the model management system 130 may perform a consistency analysis to ensure that the images that are annotated with similar labels have consistent features. Following a consistency analysis, the model management system 130 may use the training dataset to train the model. Robust details about image processing, annotation, labeling, consistency analysis, default/marker detection, and so on are described in commonly-owned U.S. patent application Ser. No. 16/669,170, filed Oct. 30, 2019, published as U.S. Pat. App. Pub. No. 2021/0097337, entitled "USER-GENERATED VISUAL GUIDE FOR THE CLASSIFICATION OF IMAGES," the disclosure of which is hereby incorporated by reference herein in its entirety.

The model management system 130 uses the initial training dataset to train a machine learning model for defect detection. After the client 105 deploys the model on a real-world dataset, the model management system 130 may refine the initial training dataset based on outputs from the deployment process. The outputs may include prediction results of the deployment process on a larger dataset from a manufacturing process. Based on the output results, the model management system 130 may identify one or more data points (e.g., images) for which the performance of the predictions is inadequate (e.g., confidence scores associated with the predictions are lower than a threshold). The identified data points may also be referred to as noisy data points. The model management system 130 may further identify one or more attributes associated with the noisy data points that do not align with a distribution of the training dataset. For example, the noisy images may be captured in a different environment which causes a shift in color of lighting that leads to ineffective predictions. The model management system 130 may identify one or more causes of inadequate performance and refine the training dataset based on the identified causes. The model management system 130 may retrain the model using the refined training dataset and send the retrained model to the client 105 for re-deployment. Further details with related to the functionalities performed by the model management system 130 are discussed in further details in accordance with FIGS. 3-7.

Figure 3:
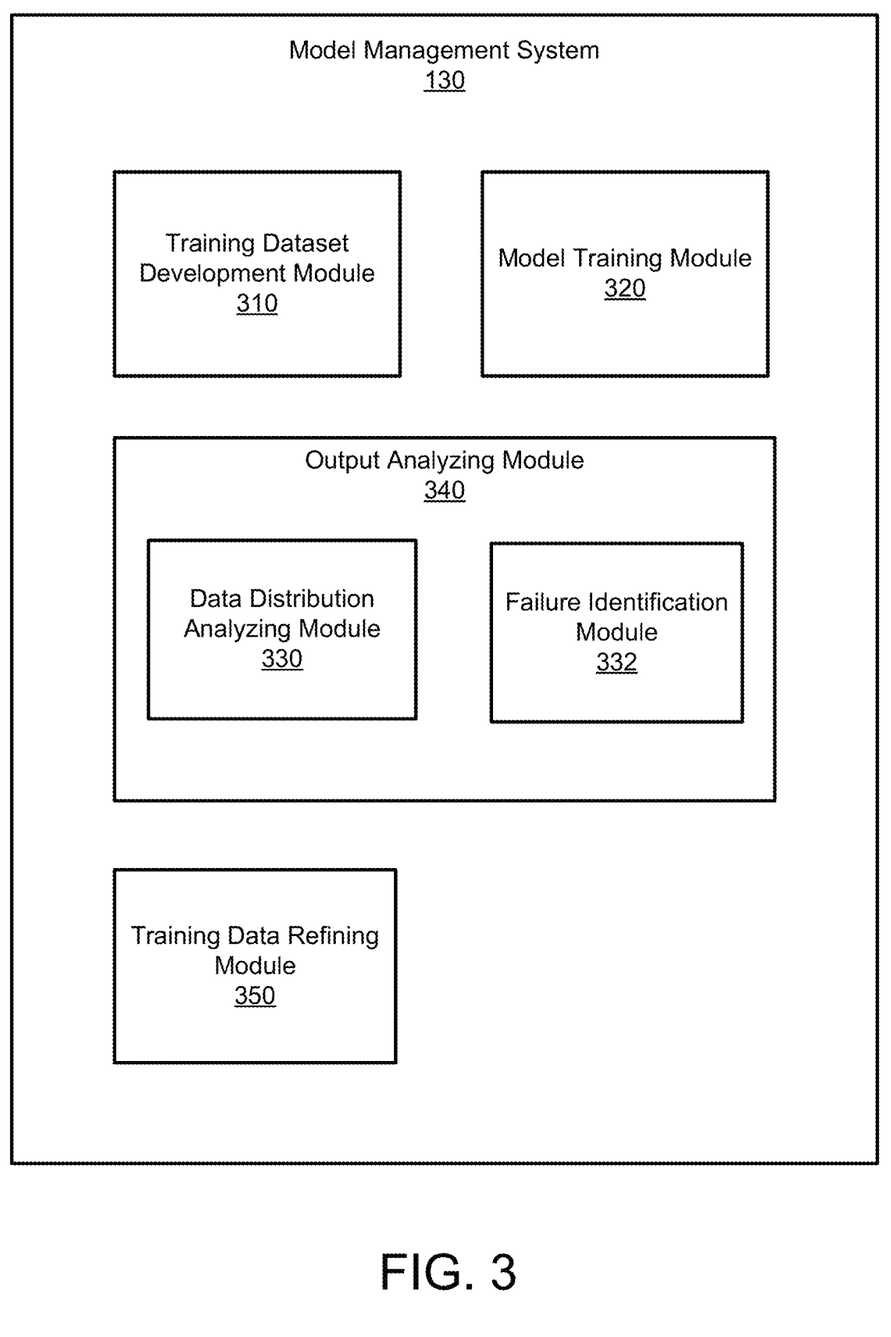
FIG. 3 is an exemplary block diagram illustrating modules in the model management system, according to one embodiment.

FIG. 3 is an exemplary block diagram illustrating modules in the model management system 130, according to one embodiment. The model management system 130 includes a training dataset development module 310 that develops an initial training dataset, a model training module 320 that performs a training process of models, an output analyzing module 340 that analyzes outputs received from a deployment process, which further includes a data distribution analyzing module 330 that analyzes distributions of training dataset and a failure identification module 332 for determining causes of failure, and a training data refining model 350 that performs a refining process for updating training datasets.

The training dataset development module 310 develops an initial training dataset based on inputs received from the client 105. The training dataset development module 310 may label received images from the client 105 if the images are not labeled. A software tool may be provided to the client 105 to develop a visual guide, which may be used to develop an initial training dataset. The training dataset development module 310 may develop the training dataset based on the framework which may include different types of defects and/or different types of products. The visual guide is then seeded using an initial set of images that are labeled with higher consistency. The visual guide may be used for various purposes such as for enabling less qualified human classifiers to add more training data, for benchmarking against which to measure the performance of human or AI (artificial intelligence) classifiers, or for training new human or AI classifiers. The visual guide may also be improved and/or expanded as more images are classified. The training dataset development module 310 may use the visual guide to label images received from the client 105 and generate an initial training dataset with labeled images. Further details about image processing, annotation, labeling, consistency analysis, default/marker detection, and so on are described in commonly-owned U.S. patent application Ser. No. 16/669, 170, filed Oct. 30, 2019, published as U.S. Pat. App. Pub. No. 2021/0097337, entitled "USER-GENERATED VISUAL GUIDE FOR THE CLASSIFICATION OF IMAGES," the disclosure of which is hereby incorporated by reference herein in its entirety.

The model training module 320 performs a training process for machine learning models using the initial training dataset generated by the training dataset development module 310. The training process may include an iterative process of optimizing a set of parameters associated with the machine learning models, each iterative process comprises multiple iterative steps of forward pass and backpropagations. Each forward pass generates a set of predictions based on the input training data. The model training module 320 may then calculate differences between the predictions and the labels of the training data based on one or more loss functions. The model training module 320 may calculate gradients based on the error terms and pass the gradients backwards through the backpropagation step, during which the parameters are updated to optimize the difference between predictions and labels. The model training module 320 may stop the iterative process when the error term meets a predetermined criteria. In one embodiment, the model training module 320 may re-train the model using a refined dataset received from the training data refining module 350, which is discussed in further details below. The trained (or re-trained) model may be saved and sent to the client 105 for deployment. The trained model may be configured to generate a set of outputs, including predictions/classifications and auxiliary information including confidence scores associated with the predictions/classifications. The outputs generated by a trained model are discussed in further details below in accordance with the output analyzing module 340.

The output analyzing module 340 may analyze outputs received from a deployment process of a machine learning model, identify data points for which the trained model performs inadequately, and identify causes of failure which are used in the data refinement process. The output analyzing module 340 as illustrated in FIG. 3 includes a data distribution analyzing module 330 that performs analysis on a distribution of a training dataset, and a failure identification module 332 that identifies one or more causes that lead to inadequate performance.

The output analyzing module 340 may receive a set of outputs from a deployment process of a trained model (e.g., from a model deployment performed by the client 105). In one embodiment, the outputs of the model may indicate whether one or more defects are present, one or more types of defects that are present, attributes of defects, and so on, as described in the framework illustrated in FIG. 2. Additionally, the outputs of the model may include auxiliary information. The auxiliary information may include a confidence score indicating a likelihood (e.g., percentage) that the image matches a label in the training dataset. Where the confidence score is below a (predefined) threshold, the output analyzing module 340 may determine that the image is not sufficiently represented in the training data. Such images may be referred as noisy data points and may be transmitted to data distribution analyzing module 330 for further analysis.

The data distribution analyzing model 330 may analyze and generate a distribution of the training dataset across multiple dimensions. The term dimension, as used herein, may refer to an attribute that represents a common (or similar) characteristic associated with datapoints in a dataset, such as an environmental factor that affects the images captured in a particular environment (e.g., brightness, color of light, focus of the images, etc.) The term distribution, as used herein, may refer to a way of organizing data points that indicates how often each value (or each range of values) is observed in the dataset. In one embodiment, the data distribution analyzing module 330 may determine a range of values for an attribute, with the range representing a grouping of the training data points. In another embodiment, the data distribution analyzing module 330 may determine one or more deterministic values (such as lighting is red/yellow) for the attributes. Stated another way, a distribution may include a spectrum comprising multiple values (or ranges) that correspond to the attributes, each value (or range) represents a grouping of data points in the training dataset. For example, the different attributes of data may include but are not limited to environmental factors, lighting color (e.g., red or yellow), focus points, brightness, etc., and a distribution of the training dataset may be that the lighting colors are red and yellow (i.e., some images captured under red light and some captured under yellow light) and the brightness level is between 1000 and 1500 lumens. The data distribution analyzing module 330 may use a heuristic approach to determine the distribution of the training dataset (e.g., by indexing datapoints in a database). Alternatively, the data distribution analyzing module 330 may use a machine learning model, such as clustering algorithms, to determine values (or ranges) that are representative of the attributes of the training dataset. The data distribution analyzing module 330 may send the analysis results to the failure identification module 332 for further analysis.

The failure identification module 332 may determine one or more causes that lead to inadequate model performance for the noisy data points based on analysis results generated by the data distribution analyzing module 330. Based on the determined distribution (e.g., one or more deterministic values or ranges), the failure identification module 332 may identify one or more attributes of the noisy data points that are deviated from the distribution of the training dataset. A datapoint is referred to as being deviated from the distribution of the training dataset if a value of the attributes does not fall within the range of the training dataset distribution or does not align with the deterministic values determined based on the training dataset. The output analyzing module 340 may use a heuristic approach to identify the attributes that deviate from the distribution of the training dataset. In another embodiment, the output analyzing module 340 may also use a machine learning model (such as clustering algorithms) to identify the attributes that depart from the distribution of the training dataset. An illustration of the identification process of causes of failure is discussed in further details in accordance with FIGS. 4-5.

Figure 4:
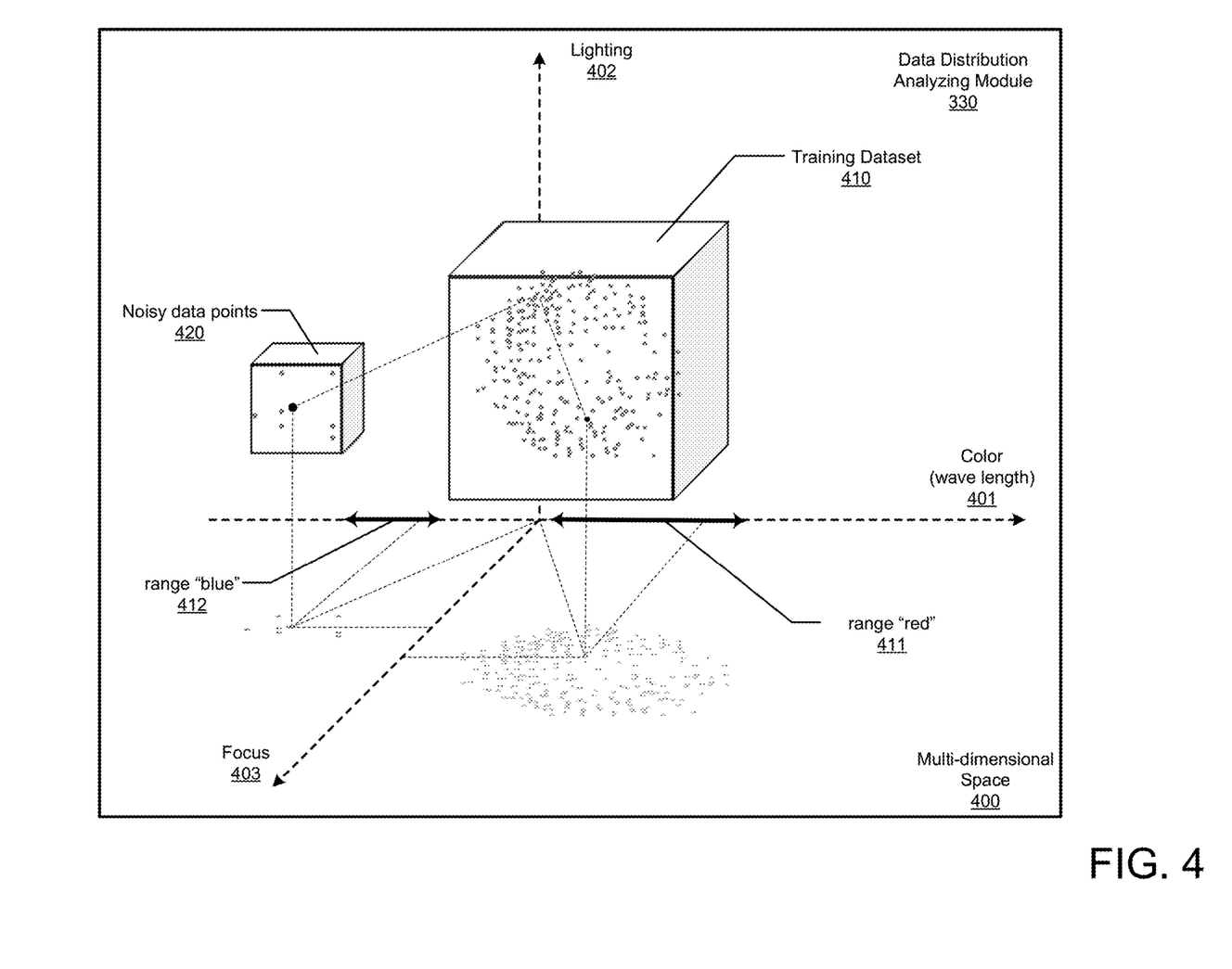
FIG. 4 is an exemplary illustration of a data distribution analysis process performed by a data distribution analyzing module of the model management system, according to one embodiment.

FIG. 4 illustrates one exemplary embodiment for identifying an attribute associated with a noisy data point as a cause of failure. In FIG. 4, the training dataset 410 and the noisy data points 420 are mapped into a 3-dimension space 400, with the three dimensions being focus 403, lighting 402, and color 401. While FIG. 4 illustrates a visualization of a 3-dimensional space, the data points may be analyzed on any number of dimensions, and any number of deviated attributes may be identified based on the analysis. The focus 403 dimension may represent depth of focus of a camera that captured the image, lighting 402 may represent brightness of the light of the environment where the image was taken, and color 401 may represent the color of the light (e.g., in wavelength in nm). The data distribution analyzing module 330 may first generate a distribution for datapoints in the training dataset 410 by mapping the training data points into the multi-dimensional space 400 and determining a range (or deterministic values) for each dimension that represents an environmental factor associated with the training dataset. For example, the data distribution analyzing module 330 may determine that images in the training dataset 410 are taken under red light 411, with a brightness of 800-1000 lumens, and a depth of focus of f with an error of tolerance of ±δ. The data distribution analyzing module 330 may send the distribution analysis results to the failure identification module 332, where causes of inadequate predictions may be identified.

The failure identification module 332 may locate the noisy data points 420 in the multi-dimensional space 400 and identify one or more attributes that deviate from the distribution of the training dataset 410. For example, as illustrated in FIG. 4, the noisy data points 420 align with the training dataset 410 on the lighting 402 dimension and the focus 403 dimension but are deviated from the training dataset 410 on the dimension color 401. Specifically, the failure identification module 332 may determine that the noisy data points 420 may be images captured under the range of blue light 412 while the images from the training dataset 410 are captured under the range of red light 411. The difference in the color of the light may be an identified attribute that causes inadequate performance of the trained model, because the trained model may, for example, incorrectly predict objects that appear to be blue as defective objects. The trained model may perform poorly for images taken in a different environment because the training dataset does not include such information for the trained model to learn. Therefore, the training dataset may be refined by the training data refining module 350 to include such information and the machine learning model may learn such information through a re-training process.

Figure 5:
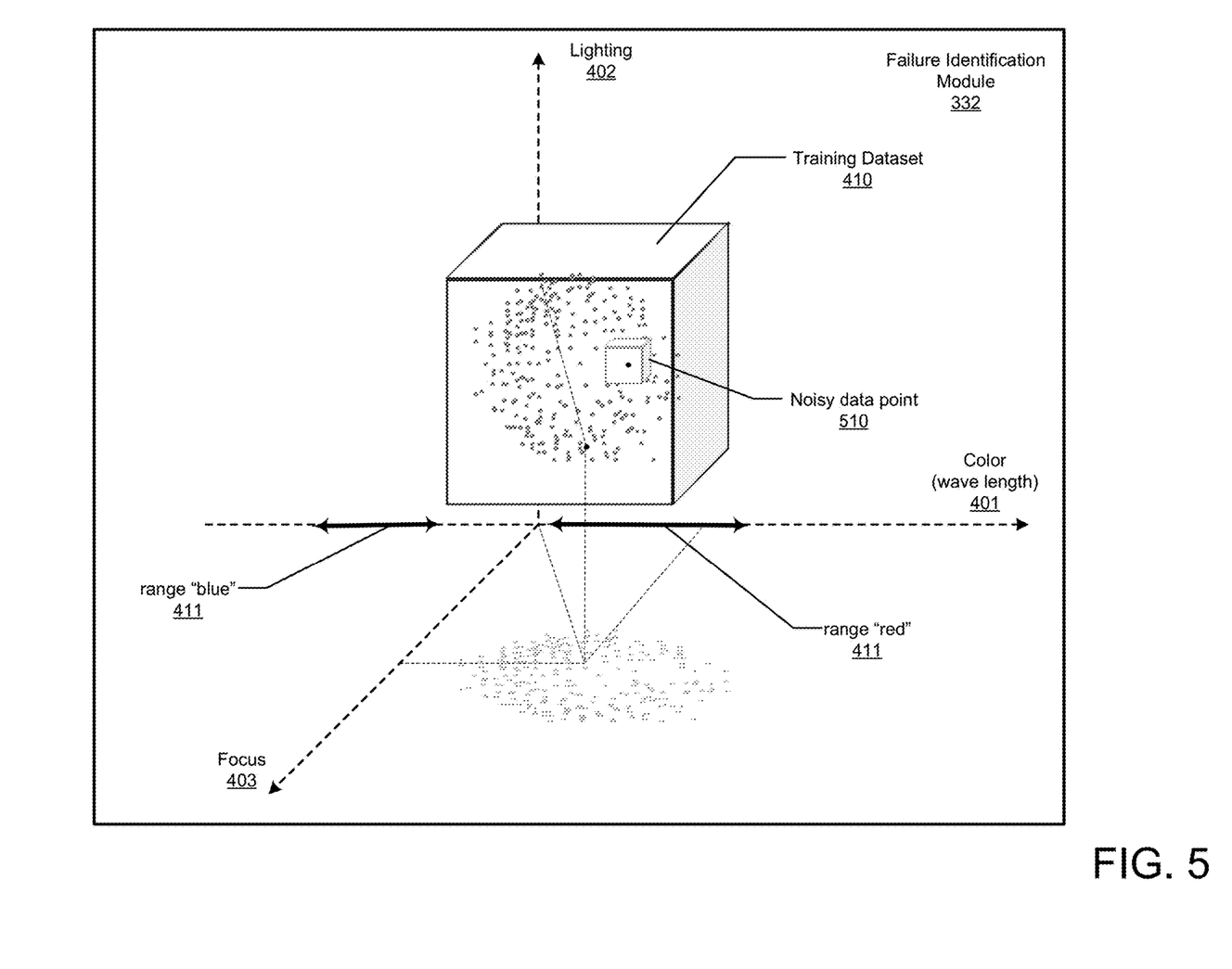
FIG. 5 is an exemplary illustration of an identification process performed by a failure identification module in the model management system, according to one embodiment.

FIG. 5 illustrates another embodiment where the failure identification module 332 may determine a cause for failure based on a new object or new type of data not represented by the training dataset. In FIG. 5, the noisy data point 510 may be identified based on a confidence score lower than a pre-determined threshold. The failure identification module 332 may determine that the noisy data point 510 is underrepresented by the training dataset 410. However, as illustrated in FIG. 5, the failure identification module 332 may perform analysis based on results from the distribution analyzing module 330 and may determine that the values for attributes associated with the noisy data point 510 align with the distribution of the training dataset 410. Specifically, the noisy data point 510 may be an image that is taken under red light, with brightness of 900 lumens, and a depth of focus of d, which align with the dimension of the training dataset. The failure identification module 332 may determine that the attributes of the image align with the training dataset. In response to determining that the attributes align with the training images, the failure identification module 332 may, in one embodiment, determine that the noisy data point 510 may be a new object that is not seen in the training dataset. For example, if the model is trained to classify images of cell phones into iPhone® and Samsung® Phones, the noisy data point may be a Pixel® Phone that is not represented by the training dataset. As another example, if the model is trained to detect defects such as textured spots, the noisy data point may be an image of a scratch caused by sandpaper which may have appearances of lines. The line scratches are not represented by the training images with spot scratches and therefore may cause inadequate model performance. The failure identification module 332 may then identify the new object (e.g., a new type of defect) as a cause of failure.

The failure identification module 332 may send the identified causes of failure to the training data refining module 350 for refinement. Referring back to FIG. 3, the training data refining module 350 may refine the initial training dataset based on the identified causes of failure. The refinement process may include getting more data through data augmentation, data generation, data collection, obtain more consistent definitions for labelling if the labels are ambiguous, etc. For example, based on the identified cause of failure (e.g., incorrectly categorizing objects under blue light as defective), the training data refining module 350 may determine to include, in the training dataset, images that are taken under blue light. In one embodiment the training data refining module 350 may automatically transmit a control signal to adjust the condition (e.g., transmit a control signal to a smart lightbulb to increase the lighting or change the color of lighting around the object prior to taking new photos). Alternatively, or additionally, the processor may transmit an alert to the user, to an operator or administrator, indicating a reason why the image is under-represented by current training dataset. Such an alert may include a recommendation on how to make the image strongly classifiable (e.g., changing one or more environmental factors, or take images of new objects). Alternatively, the processor may automatically adjust the image. The data refining module 350 may perform various types of adjustments to the image, such as applying a filter to modify brightness of the image, applying a filter to adjust a color tone of the image, or adjust a focus of the image. The data refining module 350 may adjust the image from multiple dimensions for a training dataset that is more representative. The data refining module 350 may generate a refined dataset and send the refined dataset to the model training module 320 for re-training of the model.

Figure 6:
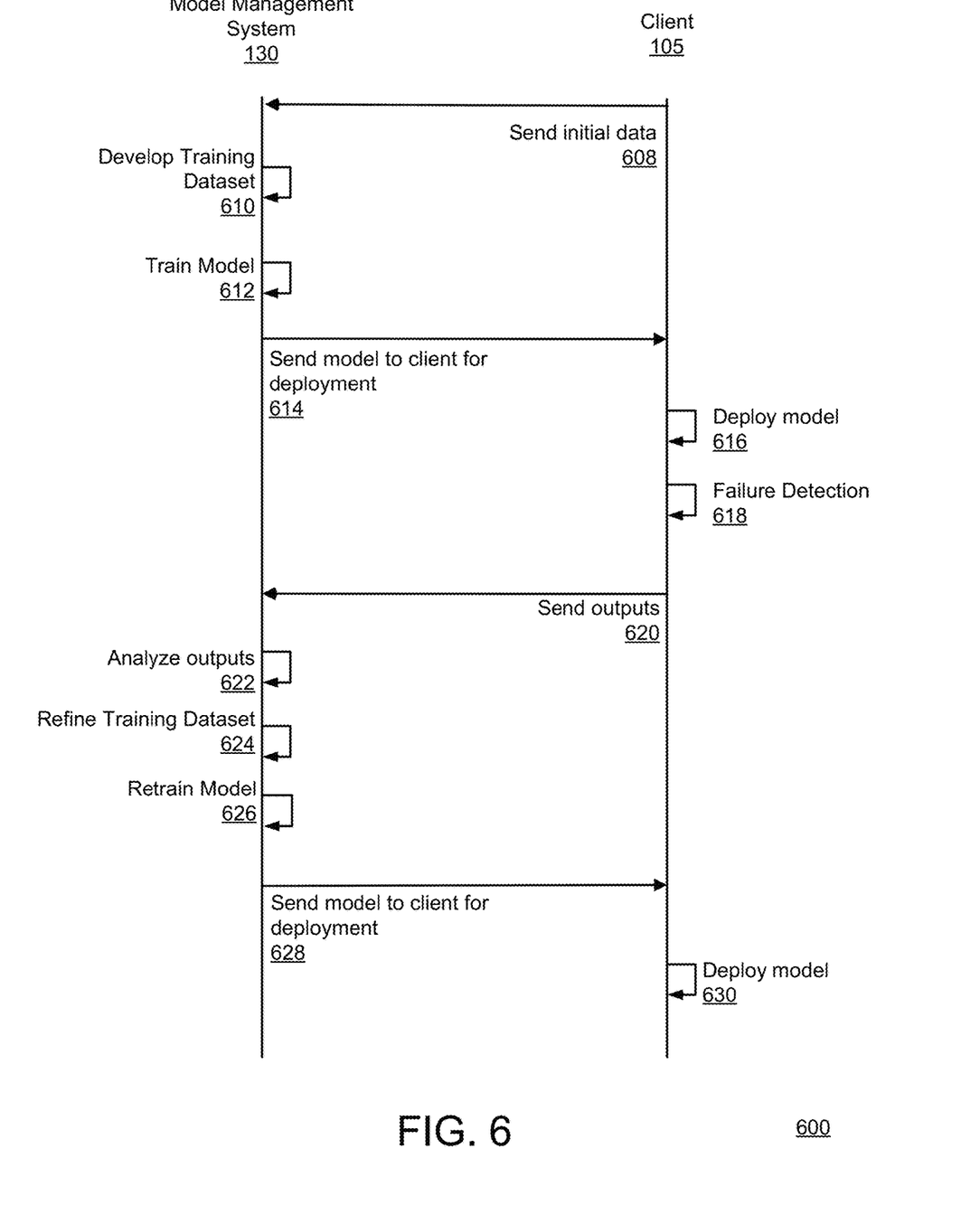
FIG. 6 is an exemplary sequence diagram illustrating a refining process performed by the model management system, according to one embodiment.

FIG. 6 is an exemplary sequence diagram illustrating a training dataset refining process performed by the model management system 130, according to one embodiment. The process 600 may start with the client 105 sending 608 initial input data to the model management system 130. The data may include initial images and a visual guidance for labeling objects. The model management system 130 may develop 610 an initial training dataset based on the received data. The model management system 130 may train 612 a machine learning model using the initial training dataset. The model management system 130 may then send 614 the trained model to the client 105 for deployment. The client 105 may deploy 616 the received model generating predictions using real-world data. The model may generate a set of outputs including confidence scores, prediction results, auxiliary information. The client 105 may send 620 the outputs to the model management system 130. The output analyzing module 340 may analyze 622 the outputs and identify noisy datapoints in the read-world dataset that are under-represented by the current training dataset. For example, the data distribution analyzing module 330 may generate a distribution of the training dataset across multiple dimensions related to attributes of environmental factors of the images in the training dataset. The failure identification module 332 may identify one or more attributes of the noisy data points that deviate from the distribution of the training dataset as causes of failure. The training data refining module 350 may refine the training dataset 624 based on the identified causes of failure and the model training module 320 may retrain 626 the module and send 628 the retrained model to the client 105 for deployment. The client 105 may deploy the retrained model 630. In one embodiment, the process illustrated in FIG. 6 may be repeated, such that additional training data refinement processes may be performed based on deployment results received from the client 105, until a desired result is achieved.

Figure 7:
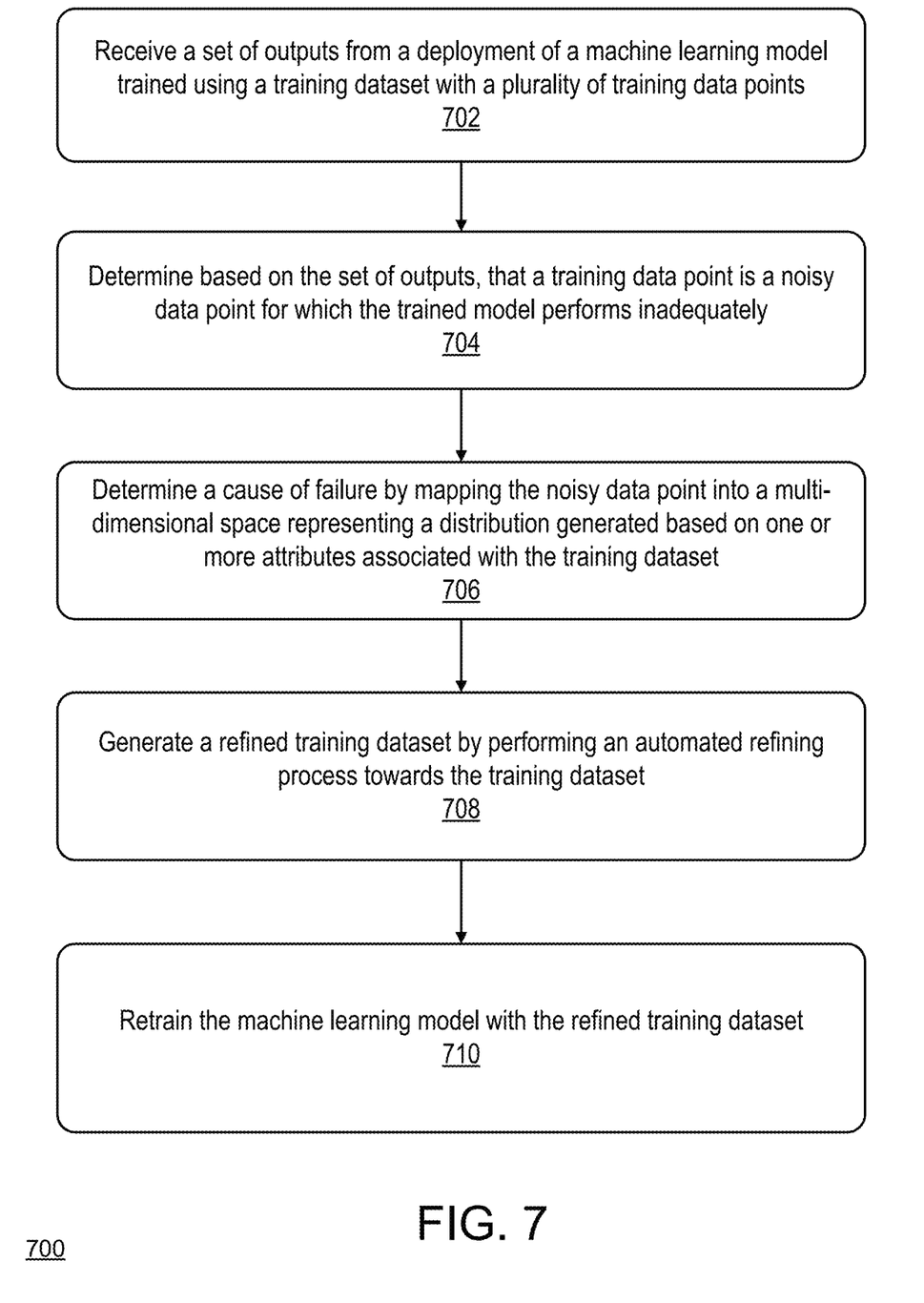
FIG. 7 is an exemplary flow diagram illustrating a refining process performed by the model management system, according to one embodiment.

FIG. 7 is an exemplary flow diagram illustrating a refining process performed by the model management system, according to one embodiment. The process 700 starts with the model management system 130 receiving 702 a set of outputs from a deployment process of a machine learning model trained using a training dataset with a plurality of training datapoints, the machine learning model associated with a set of trained parameters. The output analyzing module 340 may determine 704 based on the set of outputs that a training data point is a noisy data point for which the trained model performs inadequately. The failure identification module 332 may determine 706 a cause of failure by mapping the noisy data point into a multi-dimensional space representing a distribution generated based on one or more attributes associated with the training dataset. The training data refining module 350 may generate 708 a refined training dataset through an automated refining process. The model training module 320 may retrain 710 the machine learning model using the refined training dataset, which generates a set of updated trained parameters. The retrained model along with the updated parameters are sent to the client 105 for another deployment process.

ADDITIONAL CONFIGURATION CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for improving training data of a machine learning model through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined herein.

What is claimed is:

1. A method for refining a machine learning model comprising:
receiving a set of outputs from a deployment of the machine learning model, wherein the set of outputs is generated by the deployment using a set of trained parameters associated with the machine learning model, the machine learning model trained with a training dataset comprising a plurality of training data points, the set of outputs comprising predictions from the machine learning model based on new inputs to the machine learning model;
determining, based on the set of outputs, that a particular training data point of the plurality of training data points is a noisy data point for which the trained model performs inadequately, the noisy data point corresponding to a particular training example within the training data set that was used to train the machine learning model;
responsive to identification of the noisy data point, determining a cause of failure based on a mapping of the noisy data point into a multi-dimensional space, which represents a distribution generated based on one or more attributes associated with the training dataset;
generating a refined training dataset by conducting a refinement towards the training dataset;
retraining the machine learning model with the refined training dataset, the retraining generating a set of updated trained parameters; and
sending the set of updated trained parameters to a user.

2. The method of claim 1, wherein determining that the training data point is a noisy data point comprises:
determining a confidence score for the training data point, the confidence score indicating a likelihood that the training data point matches a label used in the training dataset;
determining whether the confidence score is lower than a threshold; and
determining that the training point is a noisy data point responsive to determining that the confidence score is lower than the threshold.

3. The method of claim 1, wherein determining the cause of failure further comprises:
determining the distribution based on the one or more attributes of the training dataset, the distribution indicating a representative value or a range of values for the one or more attributes associated with the training dataset; and
determining a cause of failure based on the determined distribution.

4. The method of claim 3, further comprising:
identifying an attribute from the one or more attributes, wherein a value or a range of values associated with the identified attribute for the noisy data point does not align with the distribution determined based on the training dataset; and
determining the identified attribute as the cause of failure.

5. The method of claim 4, wherein the refinement comprises:
generating an additional data point by capturing an additional image with a modification in the identified attribute; and
adding the additional data point to the refined training dataset.

6. The method of claim 4, wherein the refinement comprises sending an alert to a client device of an administrator, the alert indicating that the identified attribute needs adjustment.

7. The method of claim 1, wherein determining the cause of failure further comprises:
responsive to determining that the one or more attributes associated with the noisy data point align with the distribution and determining the noisy data point for which the trained model performs inadequately, determining the cause of failure as the noisy data point being associated with a new object not represented by the training dataset.

8. The method of claim 7, wherein the refinement comprises:
generating an additional data point by capturing an additional image of the new object; and
adding the additional data point to the training dataset.

9. The method of claim 1, wherein the one or more attributes are related to environmental conditions that comprise at least one of color, lighting, and focus.

10. The method of claim 1, wherein the refinement comprises, based on the cause of failure, adjusting an attribute of the one or more attributes associated with an image.

11. The method of claim 10, wherein adjusting the attribute comprises applying a filter to modify brightness or color of the noisy data point.

12. The method of claim 10, wherein adjusting the attribute comprises including additional images associated with a new object determined based on the cause of failure in the refined training dataset.

13. The method of claim 1, wherein the cause of failure is determined to be a new type of defect not observed in the training dataset.

14. The method of claim 1, wherein the mapping of the noisy data point into the distribution comprises comparing values of attributes of the noisy data point with values of the distribution.

15. The method of claim 1, wherein the mapping of the noisy data point into the distribution comprises comparing a value of an attribute of the noisy data point with a range of values associated with a corresponding attribute of the distribution generated based on the training dataset.

16. A non-transitory computer-readable storage medium storing executable computer instructions that, when executed by one or more processors, cause the one or more processors to perform operations, the instructions comprising instructions to:
receive a set of outputs from a deployment of a machine learning model, wherein the set of outputs is generated by the deployment using a set of trained parameters associated with the machine learning model, the machine learning model trained with a training dataset comprising a plurality of training data points, the set of outputs comprising predictions from the machine learning model based on new inputs to the machine learning model;

determine, based on the set of outputs, that a particular training data point of the plurality of training data points is a noisy data point for which the trained model performs inadequately, the noisy data point corresponding to a particular training example within the training data set that was used to train the machine learning model;

responsive to identification of the noisy data point, determine a cause of failure based on a mapping of the noisy data point into a multi-dimensional space, which represents a distribution generated based on one or more attributes associated with the training dataset;

generate a refined training dataset by conducting a refinement towards the training dataset;

retrain the machine learning model with the refined training dataset, the retraining generating a set of updated trained parameters; and send the set of updated trained parameters to a user.

17. The non-transitory computer-readable storage medium of claim 16, wherein the instructions to determine that the training data point is a noisy data point comprise instructions to:

determine a confidence score for the training data point, the confidence score indicating a likelihood that the training data point matches a label used in the training dataset;

determine whether the confidence score is lower than a threshold; and determine that the training point is a noisy data point responsive to determining that the confidence score is lower than the threshold.

18. The non-transitory computer-readable storage medium of claim 16, the instructions further comprising instructions to:

determine the distribution based on the one or more attributes of the training dataset, the distribution indicating a representative value or a range of values for the one or more attributes associated with the training dataset; and determine a cause of failure based on the determined distribution.

19. The non-transitory computer-readable storage medium of claim 16, the instructions further comprising instructions to:

identify an attribute from the one or more attributes, wherein a value or a range of values associated with the identified attribute for the noisy data point does not align with the distribution determined based on the training dataset; and determine the identified attribute as the cause of failure.

20. The non-transitory computer-readable storage medium of claim 16, wherein the instructions to determine the cause of failure further comprise instructions to:

responsive to determining that the one or more attributes associated with the noisy data point align with the distribution and determining the noisy data point for which the trained model performs inadequately, determine the cause of failure as the noisy data point being associated with a new object not represented by the training dataset.

* * * * *